March 18, 1958   J. J. FERNANDEZ   2,827,174
FLUID FILTER
Filed May 10, 1955
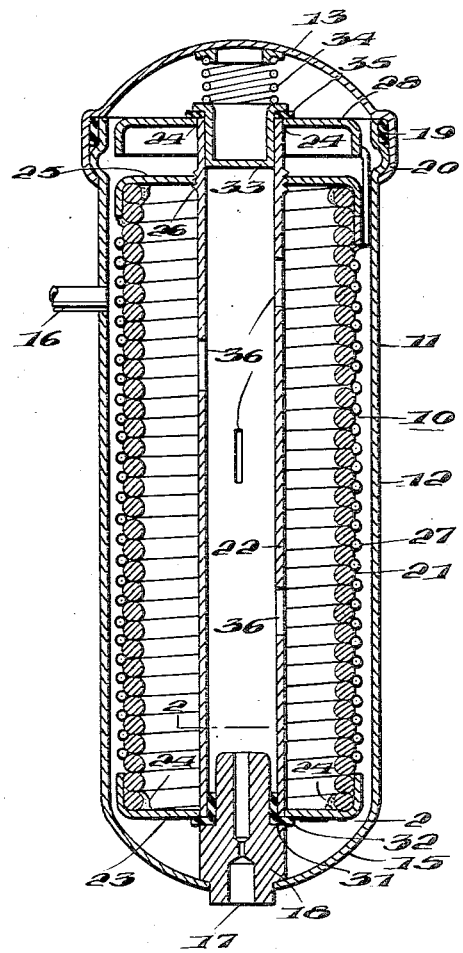
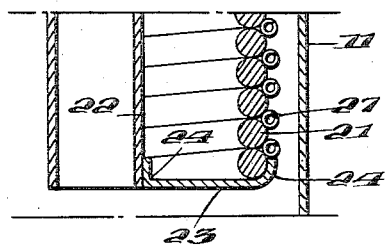
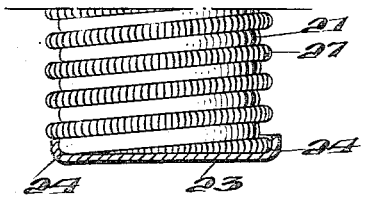
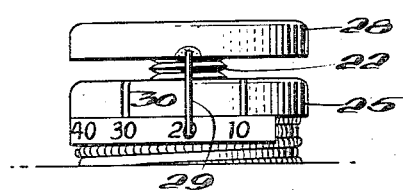
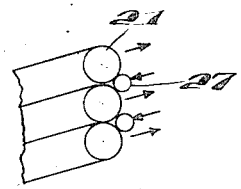
INVENTOR
John J. Fernandez United States Patent Office 2,827,174
Patented Mar. 18, 1958

2,827,174

FLUID FILTER

John J. Fernandez, Baltimore, Md., assignor of one-half to Hugh J. Loftus, Baltimore, Md.

Application May 10, 1955, Serial No. 507,315

3 Claims. (Cl. 210—91)

This invention relates to improvements in pressure filters and more particularly to adjustable and renewable filter units which may be employed for filtering fluids, and is an improvement on my copending application Ser. No. 451,171, filed August 20, 1954, now Patent No. 2,785,804.

A filter unit constructed and arranged in accordance with the present invention contemplates a novel helical coil spring adjustable filter for use in filtering fluids of different characteristics such as oil used in automotive lubrication systems and the like wherein the oil, which may be of different viscosities and is circulated under a desired predetermined pressure.

One important object of present invention is to provide a novel form of helically wound wire coil spring filter which shall be more durable in construction, dependable in operation and efficient in separating foreign matter from the fluid passing therethrough than similar apparatus heretofore employed.

Another object of the invention is to provide a novel form of spring coil filter unit which may be conveniently applied to and removed from the conventional can type filter casings now in use either as an attachment or an integral part thereof.

A further object of the invention is to provide a coil spring filtering unit having a novel arrangement of a plurality of coil springs having their coils interleaved and cooperating as a unit to regulate the degree of filtering in a wide range of materials passing through.

A further object of the invention is to provide a renewable pressure filter unit of the character designated in which the coils forming the filter wall shall be expandable laterally to provide the desired filtering action in accordance with the characteristics of the fluid handled.

A further object of the invention is to provide a novel renewable all metal filter unit of the character designated which shall be durable in construction and require minimum cleaning or attention over long periods of use.

A further object of the invention is to provide a coil spring filter unit in which one of the springs shall be of relatively large cross sectional area and a second spring of smaller cross section and having its coil sections transverse to the coil body and laid in the crevices of the first spring so as to have different relative differential movements when the coils are expanded transversely.

A still further object of the invention is to provide a filter unit of the character designated which shall be conveniently and accurately adjusted to handle fluids of different viscosities and indicate the character of fluid being filtered.

These and other objects of the invention wil be more manifest from the following specification and drawings, and more particularly set forth in the claims.

In the drawings:

Figure 1 is a sectional view in elevation of a renewable filter unit embodying the invention;

Figure 2 is a sectional view on line 2—2 of Figure 1;

Figure 3 is an enlarged fragmentary front view of the filter illustrated in Figure 2;

Figure 4 is a fragmentary front view of an indicator member associated with the filter; and Figure 5 is an enlarged fragmentary schematic view illustrating the movement of the spring coils.

Referring to Figures 1 and 2 of the drawings, wherein there is shown a preferred embodiment of a novel filter unit 10 constructed and arranged in accordance with the present invention, the numeral 11 indicates a receptacle or casing which may be of the conventional can type frequently employed in an automotive lubrication system. The casing 11 includes a sheet metal cylindrical body portion 12, a removable cover 13 fitted thereon, and a bottom portion 15 formed integral with the cylindrical body portion 12. The casing 11 is provided with an inlet opening 16 conveniently shown in the side thereof and an outlet opening 17 formed in a tubular boss 18 mounted in and located at the bottom of the casing 11. The cover 13 is secured in sealing relation with the casing wall body in any suitable manner as by an annular gasket 19 and a releasable clamp flange indicated by the numeral 20, all of which construction is well known in the art and forms no part of the present invention.

The filter unit 10 constructed and arranged in accordance with the present invention includes a helically wound coil spring 21 mounted on a perforated tubular fluid receiving member support 22 having end openings for mounting the same in the casing 11. The bottom of the coil spring is closed by a disc member 23 rigidly and integrally united with the end spring coils in any suitable manner as by soldering, welding or brazing and the like as indicated by the numeral 24. The upper coils of the spring 21 are similarly secured to a top closure disc 25 adjustably mounted on a threaded section 26 of the support 22 for angular movement relative thereto as hereinafter more fully described.

Associated with the coil spring 21, the coil sections of which are of relatively large cross-section, is a second coil spring 27 of smaller cross-sectional diameter and laid in or interleaved with the crevices of the adjacent coils of the larger spring. The upper and lower end portions of the coils of the spring 27 are integrally united with the end coils of spring 21 and united with the peripheral portion of the closure discs 23 and 25 as heretofore indicated by soldering, etc.

In this particular embodiment of the invention the coil spring 27 is a hollow helically wound spring with its convolutions at right angles to the surface of the solid cross-section of the convolutions of the larger main spring 21 as shown in Figures 2 and 3; the feature being that the coils 21 and 27 have different movement characteristics which produce the desired physical contact and thus enable the filter to produce a higher degree of fluid filtering control than that attainable by ordinary coil spring filters in present day use.

The adjustment of the filtering action of the springs is controlled by the angular movement of the top disc 25 relative to the tubular support 22. It will be noted that the angular movement of the disc 25 expands the coils of the spring with a differential movement as particularly shown in Figure 5. The relative movement of the disc member 25 is positively controlled by an adjacent disc member 28 fixedly united to the upper end of the tubular support 22 and provided with a depending finger 29. This finger engages one of several notches 30 formed on the outer peripheral portion of the disc 25 as shown in Figure 4. Each notch indicates the grade of fluid passing through the filter.

The coil spring filter unit is retained in the casing 11 by means of a flange 31 formed near the inner end of the tubular boss 18 and a sealing gasket 32. The upper end of the tubular support 22 is yieldably retained by a tubular boss 33 projecting into the end of the support 22 and a spring 34 engaging the filter casing cover member 13. The boss 33 is sealed by a gasket 35 which prevents fluid from leaking between the fluid receiving support 22 and the interior of the filter casing 11.

Having thus described a renewable and adjustable filter unit constructed and arranged in accordance with the present invention, the operation is as follows: Fluid such as lubricating oil under a predetermined pressure is admitted to the filter casing 11 by means of the inlet opening 16 to the chamber walls formed by the spring coils 21 and 27 and thence through perforations 36 in the tubular member 22 to the outlet opening 17. This arrangement permits any coarse particles coming into the filter casing 11 to drop into the bottom portion without attempting to pass through the filter coils and thus unduly clog it. The degree or amount of filtering action is positively controlled by regulating the lateral movement of the coil spring sections by twisting the threaded disc 25 relative to the fixed bottom disc 23 and the disc 28 rigidly fastened to the tubular support 22.

The finger 29 carried by the disc 28 rides or engages one of the several notches 30 and serves as a detent to hold and maintain the angular adjustment of the coil springs for a particular grade of fluid as indicated by the indicia 20, 30, or 40 as the case may be. An important feature of this arrangement is the lateral movement of the coil sections rather than the usual compressive movement heretofore employed in single coiled spring filters.

Another important advantage of the novel filter unit is that it is all metal and of simplified construction which is comparatively free of clogging for much longer periods of time as is the case of filter using fibrous material. If and when it is desired to change the filter unit, the casing cover 13 is removed and the filter unit 10 lifted out and replaced without the aid of any special tools thus a saving in time and labor. The filter having been removed, it may be readily cleaned by rinsing it in a suitable detergent and immediately returned for use in the casing 11 and lubrication system from which it was removed.

While I have shown a preferred embodiment of my novel filter, it is obvious that various changes may be made therein without departing from the scope of the invention as defined by the appended claims.

What I claim is:

1. A renewable fluid filter unit comprising a pair of helical coiled springs of different diameter and wound together in overlapping relation so as to form a cylindrical walled fluid receiving chamber, a perforated tubular support for said coil springs and having communication with said chamber, closure means at the bottom portion of said springs for rigidly uniting them together and to said support in sealing relation, means at the top portion of said springs for rigidly uniting them together and forming a closure for the spring chamber, said closure means having threaded engagement with the support to twist the spring in angularly moveable relation to said support and means for admitting fluid to one end of said tubular support for delivery to said spring-formed chamber.

2. A filter unit of the character designated in claim 1 including means for adjusting the angular relation of the spring coils relative to each other and thereby uniformly varying the contact pressure between the individual coils to regulate the filtration of fluid passing through the coils.

3. A renewable filter unit of the character designated in claim 1 including means for indicating the relative movement between the upper and lower spring mountings to produce the desired filtration between the cooperating spring coils.

References Cited in the file of this patent

UNITED STATES PATENTS

| | | |
|---|---|---|
| 707,611 | Monjeau | Aug. 26, 1902 |
| 2,100,266 | Perry | Nov. 23, 1937 |
| 2,126,938 | Williams | Aug. 16, 1938 |
| 2,699,260 | Komline | Jan. 11, 1955 |

FOREIGN PATENTS

| | | |
|---|---|---|
| 683,227 | Great Britain | Nov. 26, 1952 |